Oct. 31, 1939.  A. C. PETERSON  2,178,050
AUTOMATIC FRICTIONAL CLUTCH
Filed Jan. 29, 1936  2 Sheets-Sheet 1

Inventor
Adolph Peterson.

Oct. 31, 1939.   A. C. PETERSON   2,178,050
AUTOMATIC FRICTIONAL CLUTCH
Filed Jan. 29, 1936   2 Sheets-Sheet 2

Inventor
Adolph C. Peterson

Patented Oct. 31, 1939

2,178,050

UNITED STATES PATENT OFFICE 2,178,050

AUTOMATIC FRICTIONAL CLUTCH

Adolphe C. Peterson, Minneapolis, Minn.

Application January 29, 1936, Serial No. 61,338

16 Claims. (Cl. 192—105)

My invention relates to frictional clutching means principally for internal combustion engines, and is called automatic frictional clutch.

The principal objects of my invention are to provide a form of clutch for use principally with internal combustion engines which clutch means shall be simple in its construction, reliable in operation and automatic in its functioning, if it is desired to have it automatic in its functioning. An object is to provide a clutch means which shall be positive in its engagement and yet shall be so gradually engageable when engaged that its clutching action is very smooth and without jerking, and is so gradually engaging in every engagement without any especial care of the operator therefor. An object is to provide a form of clutch means which may in its construction be so made that it is automatically engaging at a predetermined speed of the engine and that whenever that speed is not attained the clutch will automatically disengage. An object is to provide a form of clutch which shall be capable of manual disengagement when it is desired so as to render the automatic engagement ineffective at the will of the operator, while at the same time the clutch may be so constructed that it has only the automatic control. An object is to provide a form of clutch engagement means which is inherently uniform and perfectly equalized in its pressure application so that improved engagement or functioning results. In general the object is to provide improved clutching means for internal combustion engines.

The principal devices and combinations of devices comprising my invention are as hereinafter described and as defined in the claims. In the accompanying drawings which illustrate my invention like characters refer to like parts throughout the several views.

Referring to the drawings.

Figures 3, 6:
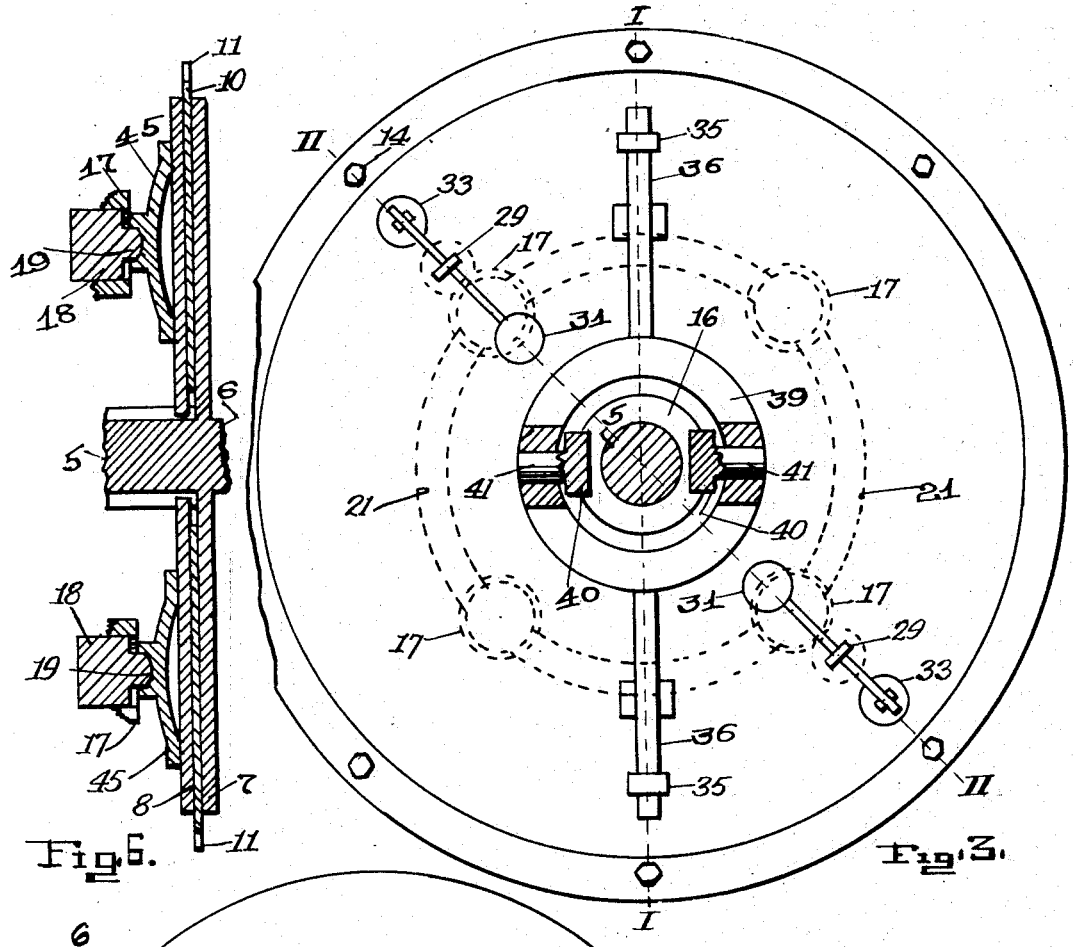
Fig. 3 is a view in elevation taken from the left of either Fig. 2 or from the location of the section on the line III—III of Fig. 1.
Figure 5:
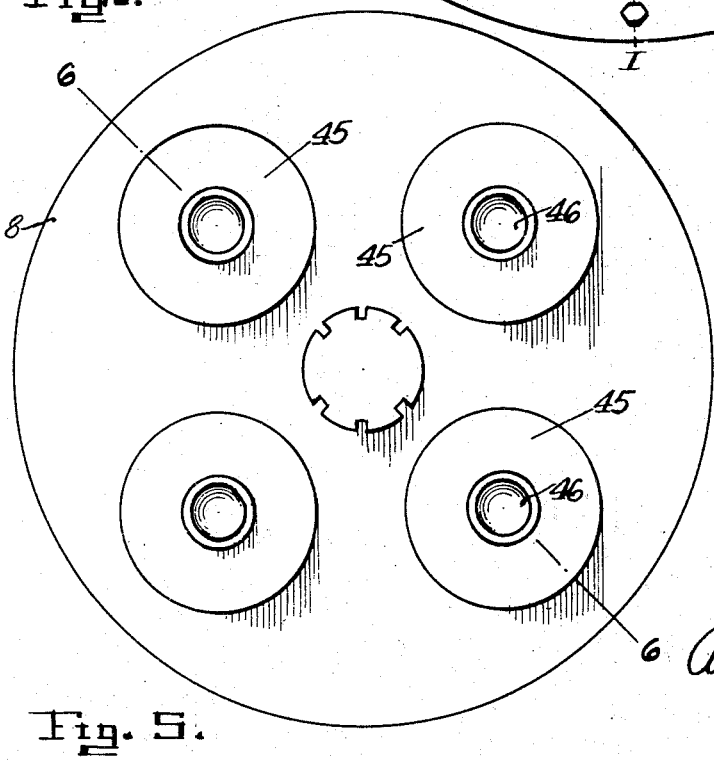

Figure 5 is a detail view of the rear face of a frictional disk 8 showing applied thereto a set of cups 45 constituting a modified form for application of the thrust of pistons 18, and Figure 6 shows a cross-section of this modified form of disk with cups 45 applied, this cross-section being taken angularly on the line 6—6 of Fig. 5 and is on a plane at right angles to the face of Figure 5, and shows the pistons 18 as they are applied to the depressions 46.

Referring to the figures from 1 to 3 both inclusive, the numeral 1 indicates the crank case of an engine, 2 its crank shaft, 3 its connecting rod, this much of an engine being shown only to diagrammatically illustrate the engine and to show the application of the clutch means thereto. The crank shaft has attached thereto or secured thereto by any means or formed integrally therewith an engine flywheel 4 and this flywheel has incorporated therewith the essential elements of this novel clutching means.

A driven or secondary shaft 5 is at its front end or one end rotatably mounted by means of the stub shaft 6 in a bore or bearing in the axial center of the flywheel or end of the crank shaft 2. This driven shaft has associated with it the two driven disks 7 and 8 one of which may be formed integrally with or flexibly attached to it in any manner and the other of which is shown as slidable axially of the driven shaft 5 and rotatably secured to it by means of the tongue and groove construction 9. These driven disks should in any manner be made axially movable a short distance and the driven shaft 5 should have some slight axial movement if the one disk or either of the disks are flexibly attached, but in any case they should be yieldable axially so as to effect the engagement described.

The flywheel has one auxiliary or supplemental disk 10 which is slidable axially of it and by means of teeth or lugs 11 is rotatably engaged by the grooves 12 in the interior of the flywheel drum 13. These disks form a multiple disk clutch but it is to be noted that only one frictional disk or driven disk may be used for engagement against the flywheel.

There is attached to the rear of the flywheel drum 13 by the bolts 14, a cast or forged cover 15 and this has or may have a central bearing 16 wherein the driven shaft 5 rotates. The cover 15 is circular in shape and has formed integrally with it, that is cast or forged with it on the side toward the clutch disks, a plurality of small cylinders 17 each of which has its axis parallel with the axis of the driven shaft 5 or the crank shaft 2 and is a short cylinder open at the end toward the disks and adapted to have reciprocable therein the pressure responsive pistons 18 of which there is one for each cylinder 17.

Each of the pressure responsive pistons 18 has on the end toward the disks, a knob 19 or other means engageable against the nearest or end driven disk. This nearest driven disk is in the nature of a compressing disk and should be especially heavy or strong in construction so that it can uniformly transmit the pressure of the pressure responsive pistons without bending or yielding. It is to be noted however that in some constructions this nearest disk may be bendable or of a spring construction so that it is yieldable and that in case it is so made the form of supplemental compression cup or supplemental disk illustrated in Figure 5 should be used, one for each pressure responsive piston associated with its knob 19, to receive the pressure of that piston 18. Either of such constructions may be used and in some constructions the compression cup would preferably be used to transmit the compression in order to more effectively secure the benefit of the uniform pressure of engagement from the pistons 18. Likewise the other disks used may be made yieldable or spring-like in substance to secure the yieldable character and they may be made normally of a slightly bent form to secure quick release and gradual engagement.

Each cylinder 17 has a port 20 by means of which there is permanent connection with an annular conduit 21 formed in the cover 15. The annular conduit 21 is under operation adapted to receive liquid as compressed or pumped from two pump cylinders 22 which are each formed integrally with or attached to the cover 15 on its side toward the disks, and each pump cylinder 22 has its axis at right angles to the axis of the driven shaft 5 and has a related reciprocable piston 23 operable by eccentrics 24 on an eccentric 25 on driven shaft 5. Thus each pump piston 23 is adapted to have one reciprocation in its pump cylinder for each revolution of the driven shaft 5 relative to the flywheel 4. The capacity of these pumps is not large but must be sufficient to secure the necessary pressure after a small number of revolutions, to secure the gradual engagement desirable. This relative capacity can best be determined by trial for the especial type of construction and use.

The pump cylinders 22 deliver by means of the non-return valved ports 26, non-return valves 27, to conduit 21 and the pressure responsive piston cylinders 17. This conduit 21 and the cylinders 17 may be released or relieved of pressure by means of either of two relief methods, either of which may be alone used in the construction, or which may be used conjointly as here shown. One of these relief methods comprises the ports 28 which deliver from the conduit 21 to the interior space of the casing formed by the flywheel and cover 15, that is space A, and these ports 28 are controlled by slidable valves 29, each of which has a loop at its end wherein is a lever 30 of governor arm 31, and this lever and the valve is yieldably returned to the position whereby its port 32 is in communication with port 28, by coil spring 33, and is adapted to be forced to the position shown, whereby the ports 28 are completely closed, whenever centrifugal force on the governor arms 31 is sufficient to overcome the springs 33 and this will occur at any predetermined speed of the crank shaft 2, say four or five hundred or three hundred or whatever may be determined to be the desirable speed of engagement. The effect of springs 33 may be made adjustable but this is not shown for the sake of simplicity in the drawing.

The other method of relief of the pressure is comprised by the ports 34 which are adapted to release pressure from conduit 21 whenever the valves 35 are pulled outwardly in their small valve bores by means of the levers 36, the latter trunnioned on the rear side of the cover 15. These levers 36 are normally kept in the position whereby valves 35 close the ports 34 by means of the yieldable springs 37, of which there is one for each lever 36. These levers may be contacted by the ring 38 whenever the ring 39 by means of lever 40 is moved to pull the valves 35 outwardly so as to open the ports 34 and thereby release pressure in the conduit 21 and cylinders 17, to the interior space A. The ring 39 by means of trunnions 41 is flexibly attached to lever 40, and the latter may be an independent lever in an automobile or associated by linkage with any other operating control lever as a brake lever or accelerator lever, but is preferably independent as shown.

In the use of my device, or its construction, the manual control methods shown may be omitted, and reliance for control placed solely upon the other means, or they may be used conjointly. This would depend to some extent upon the nature of the transmission means used, and whether it is desired to use the transmission means in the customary manner for disconnecting the driving line, when no motion is desired. In the event only the automatic control is used this would be effective whenever the predetermined speed of the crank shaft 2 is reached to clutch the crank shaft 2 to driven shaft 5, and declutch it whenever the speed is less. In the event only the hand or manual control is used this clutching would depend on the use of lever 40 by the operator.

Assuming that the automatic control is adopted, the operator when desiring to drive the automotive vehicle, by the usual device or accelerator control, causes the engine crank shaft 2 to accelerate, and when the predetermined speed is reached, the governor arms 31 cause valves 29, the relief valves, to move inwardly, closing the ports 28 and (the lever 40 being placed to be ineffective to open valves 35) the pump pistons accumulate pressure in the conduit 21 and cylinders 17 and this pressure may reach any pressure necessary to cause engagement positively, as this pumping and increase of pressure will continue until the relative revolution of the crank shaft and driven shaft ceases, and that is until complete clutching is effective.

This clutching will proceed at a speed or gradual increase of effectiveness according to the relative capacity of the pump pistons to pump the liquid. The casing formed by the flywheel and cover 15, the space A will in use be filled with a liquid such as a very fluid lubricating oil or any fluid which will not become thick or viscous at the changes in temperature usually encountered in use. This liquid should fill the space A nearly full so that whenever centrifugal force is exerted by flywheel the liquid will surround each of the pump cylinders so that liquid may be inducted through the ports 42 in the side wall of the cylinders 22 from the conduits 43. The usual non-return valved ports may be adopted in place of the side wall ports 42 if that use would render the device more efficient in use, but the induction ports shown, covered and uncovered by the piston are adopted for simplicity in the illustration.

Whenever the operator desires to slow up his vehicle or declutch he may do so by permitting the engine crank shaft 2 to decelerate in the customary manner as by use of an accelerator pedal connected or controlling a throttle valve of the engine. Such deceleration will allow the flywheel to decelerate to a speed less than the effective speed of clutch engagement, and thereupon the governor arms will be moved by their springs to pull the valves 29 to open ports 28 so that the liquid pressure in conduit 21 is released to space A and thereupon the frictional disks will be released from pressure.

Or at any time he may move lever 40 to open ports 34 by valves 35 to space A and thus the pressure is relieved, and this release may continue as long as the operator keeps lever 40 in a position to open ports 34, and he may do this as when his vehicle is standing at a road crossing awaiting a go signal, to insure against starting of the vehicle. The use of this lever 40 is however not necessary, the clutching will be effective or ineffective according to the speed of the crank shaft 2, and the predetermined speed of control by the governor arms. The liquid should not completely fill space A so as to permit some degree of expansion of the liquid against air in the space A.

Figures 1, 2, 4:
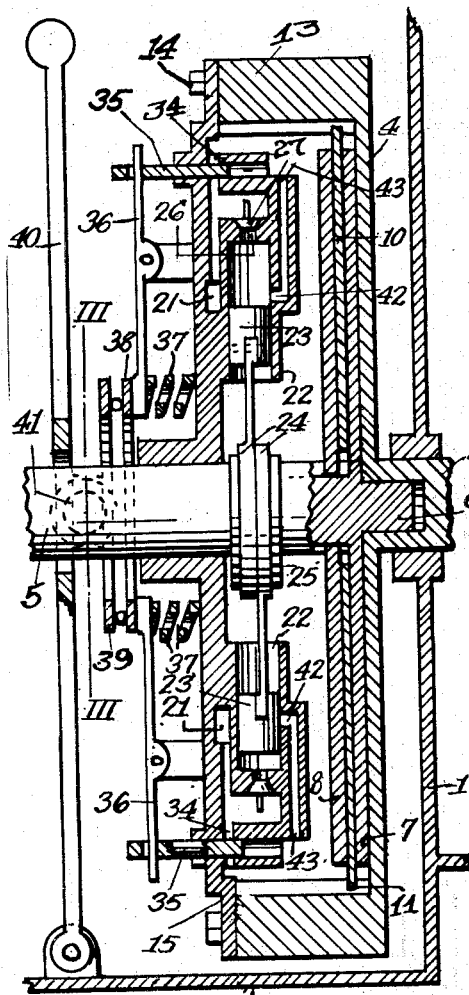
Fig. 1 is a view chiefly in vertical section on a plane through the axis of the rotating parts and on the line I—I of Fig. 3.
Fig. 2 is a section on a plane through the axis of the rotating parts but at an angle to the plane of Fig. 1 and taken on the line II—II of Fig. 3.
Fig. 4 is a detail view of the governor levers showing a modification of their construction, to show linkage connecting them, this being omitted in Figs. 1, 2, 3 for the sake of simplicity in the drawing, and being a modified form to be utilized if found desirable or necessary.

Referring to Figure 4 this figure shows a linkage 44 which associates the governor arms so as to cause them to move in unison according to the control, but it is to be noted that in the construction shown in Figures 1, 2, 3, the springs should be of such evenly graduated pressure or uniform that the control will be alike in both valves, or only one of the control valves may be used instead of two. In Fig. 5, a rear view of the rear frictional driven disk is shown with a number of compressor cups 45 equivalent to the number of pistons 18, and in this case or with their use, the knobs 19 would bear against the depressions 46 in the cups 45 and the under side of cups 45 would bear against the friction disks to transmit the pressure from the pistons 18 to the disks. The cups may be on their under side so hollowed out that only their circumferential edges touch the frictional disk. Cups 45 may be used in first form shown when 8 is a flexible disk or semi-flexible.

While I have shown particular devices and combinations of devices in the illustration of my invention I contemplate that other detailed devices and combinations of devices may be used in the realization of my invention without departing from the spirit and contemplation of my invention.

What I claim is:

1. In a clutch, a driving element, a driven element, frictional elements adapted to grip one to the other of the driving and driven elements, pressure responsive elements adapted to force the frictional elements into contact, means subjective to the relative rotation between the driving and the driven elements to impose fluid pressure upon the pressure responsive elements, and centrifugally controlled means responsive to speed of the driving element and adapted on attainment of speed exceeding a predetermined minimum to impose the fluid pressure upon the pressure responsive elements.

2. In a clutch, a driving element, a driven element, frictional elements adapted to grip one to the other of the driving and driven elements, pressure responsive elements adapted to force the frictional elements into contact, means subjective to the relative rotation between the driving and the driven elements to impose fluid pressure upon the pressure responsive elements, and centrifugally controlled means responsive to speed of the driving element and adapted on attainment of speed exceeding a predetermined minimum to impose the fluid pressure upon the pressure responsive elements.

3. In a clutch, a driving element, a driven element, frictional elements adapted to grip one to the other of the driving and driven elements, pressure responsive elements adapted to force the frictional elements into contact, means subjective to the relative rotation between the driving and driven elements and adapted to impose fluid pressure upon the pressure responsive elements, means responsive to speed of the driving element and adapted on attainment of speed exceeding the predetermined minimum to impose the fluid pressure upon the pressure responsive elements.

4. In a clutch, a driving element, a driven element, frictional elements adapted to grip one to the other of the driving and driven elements, pressure responsive elements adapted to force the frictional elements into contact, means subjective to the relative rotation between the driving and driven elements, and adapted to impose fluid pressure upon the pressure responsive elements, means responsive to speed of the driving element and adapted on attainment of speed exceeding the predetermined minimum to impose the fluid pressure upon the pressure responsive elements.

5. The means described in claim 4 and means subjective to manual control to relieve the pressure of the fluid pressure upon the pressure responsive elements.

6. In a clutch, a driving element, a driven element, frictional elements adapted to grip one to the other of the frictional elements, pressure responsive elements adapted to force the frictional elements into contact, a fluid pumping means having one element rotatable in association with the driving element and having another element rotatable in association with the driven element, and adapted to impose fluid pressure upon the pressure responsive elements, and a control means subjective to speed of the driving element and adapted on attainment of speed exceeding a predetermined minimum to impose the fluid pressure upon the fluid pressure responsive elements.

7. In a clutch, a driving element, a driven element, frictional elements adapted to grip one to the other of the driving and driven elements, pressure responsive elements adapted to force the frictional elements into contact, a fluid pumping means having one element rotatable in association with the driving element and having another element rotatable in association with the driven element, and adapted to impose fluid pressure upon the pressure responsive elements, and a control means subject to speed of the driving element and adapted on attainment of speed exceeding a predetermined minimum to impose the fluid pressure upon the fluid pressure responsive elements.

8. In a clutch, a driving element, a driven element, frictional elements adapted to grip one to the other of the driving and driven elements, pressure responsive elements reciprocable in cylinders secured to one of the driving and driven elements and adapted to force the frictional elements into contact, a fluid pumping means operable to pump fluid into the cylinders of the pressure responsive elements by relative rotation between the driving and driven elements, and a control means subjective to speed of the driving element so as on attainment of speed exceeding a predetermined minimum to impose the pressure upon the pressure responsive elements.

9. In a clutch, a driving element having a flywheel drum attached thereto, a driven element, frictional elements related one to the flywheel and the other to the driven element, pressure cylinders carried in a cover attached to the flywheel drum and having reciprocable therein pressure responsive pistons adapted to impose force upon the frictional elements to grip them together, fluid pumping means having one element in association with the driving element and another element in association with the driven element and adapted by relative rotation of the driving and driven elements to pump fluid into the pressure cylinders, and a control valve means adapted to relieve or impose fluid pressure upon the pressure responsive pistons, the control means responsive to speed of the driving element by centrifugal governor means controlling the control valve means, to impose the fluid pressure upon the pressure responsive pistons on speeds exceeding a predetermined minimum and to relieve the fluid pressure on speeds under the predetermined minimum.

10. In a clutch, a driving element having a flywheel drum attached thereto, a driven element, frictional elements related one to the flywheel and the other to the driven element, pressure cylinders carried in a cover attached to the flywheel drum and having reciprocable therein pressure responsive pistons adapted to impose force upon the frictional elements to grip them together, fluid pumping means having one element in association with the driving element and another element in association with the driven element and adapted by relative rotation of the driving and driven elements to pump fluid into the pressure cylinders, and a control valve means adapted to relief of or imposition of the fluid pressure upon the pressure responsive pistons, the control means responsive to speed of the driving element by centrifugal governor means controlling the control valve means to impose the fluid pressure upon the pressure responsive pistons on speeds exceeding a predetermined minimum and to relieve the fluid pressure on speeds under the predetermined minimum.

11. In a clutch, a driving element, a driven element, a plurality of friction disks normally out of engagement with each other, certain of the disks being operatively connected to the driving element and certain of the disks being operatively connected to the driven element, pistons disposed behind said disks, means connected with the driving and driven elements for exerting fluid pressure on said pistons to cause the engagement of said disks, means automatically governed by the speed of the driving element to impose the fluid pressure on said pistons on speed of the driving element exceeding a predetermined minimum and to relieve said fluid pressure from said pistons on speeds under the predetermined minimum.

12. In a clutch, a driving element, a driven element, a plurality of friction disks normally out of engagement with each other, certain of the disks being operatively connected to the driving element and certain of the disks being operatively connected to the driven element, pistons disposed behind said disks, means connected with the driving and driven elements for exerting fluid pressure on said pistons to cause engagement of said disks, means automatically governed by the speed of the driving element to impose the fluid pressure on said pistons on speed of the driving element exceeding a predetermined minimum and to relieve said fluid pressure from said pistons on speeds under the predetermined minimum, and means manually controlled for relieving said fluid pressure.

13. In a frictional clutching means, a driving element and a driven element and clutching means therebetween comprising frictional members and means for automatically engaging and disengaging said frictional members, said means including a servo-device comprising a fluid pump deriving power from the driving element, a fluid pressure responsive means actuated by said pump and operative to engage and maintain in engagement the frictional members and a by-pass valve rendering the fluid pressure responsive means inoperative when the valve is open and controlled by a speed responsive means subjective to speed of the driving element to open the by-pass when the speed is under a predetermined minimum and to close the by-pass when the speed exceeds a predetermined minimum.

14. The means described in claim 13 and means manually controlled for relieving the fluid pressure from the fluid pressure responsive means.

15. In a clutching means, a driving element and a driven element and a clutching means therebetween comprising frictionally engaging members and means for automatically engaging and disengaging said members, said means including in combination fluid pumping means and clutch-engaging pressure responsive means associated with one of said frictional members and a fluid connection between said pump and said pressure responsive means, means associated with the frictional elements for actuating the pump at a rate proportionate to the difference of the rotational speeds of the driving and driven frictional members, and a by-pass valve rendering the pressure responsive means inoperative when the valve is open and controlled by a speed responsive means subjective to speed of the driving element to open the by-pass when the speed is under a predetermined minimum and to close the by-pass when the speed exceeds the predetermined minimum.

16. The means described in claim 15 and means manually controlled for relieving the fluid pressure from the fluid pressure responsive means.

ADOLPHE C. PETERSON.